2,756,226
ACID-STABLE PENICILLINS

Ernst Brandl, Kundl, and Hans Margreiter, Radfeld, Rattenberg, Tyrol, Austria, assignors to Biochemie, Gesellschaft m. b. H., Tyrol, Austria No Drawing. Application February 7, 1955, Serial No. 486,689

3 Claims. (Cl. 260—239.1)

This is a continuation-in-part of our copending U. S. Patent application Serial No. 349,936, filed April 20, 1953, now abandoned.

This invention relates to novel compounds, and more particularly to the solid acid forms of phenoxymethyl penicillin and p-cresoxymethyl penicillin.

It has long been known that the various penicillins produced by mold-growth procedures are quite unstable in the presence of acids, and that when such penicillins are exposed even to mild acids they rapidly undergo degradation and loss of antibiotic activity. This instability towards acids has serious disadvantages, for not only does it increase the difficulty of penicillin purification, but it is an obstacle in the provision of stable pharmaceutical preparations of penicillin, and limits the usefulness of oral administration of penicillin.

We have discovered novel solid penicillin acids which quite unlike other penicillin acids display a remarkable stability against acids. Our novel acids are so stable against acids that the solid penicillin acids can be recovered from an aqueous solution of their salts simply by acidifying the solution and filtering off the solid crystalline penicillin acid which precipitates. The most surprising acid stability of our novel acids is well illustrated by the experimental observation that whereas penicillin G has a half-life potency value of only 18 minutes at a pH of 2.1 and a temperature of 24° C., phenoxymethyl penicillin acid shows no loss of potency upon exposure to acid conditions of pH 1 to pH 2 at 24° C. for as long as 48 hours. The same surprising degree of stability is possessed by p-cresoxymethyl penicillin.

The surprising acid stability of our novel penicillin acids makes the compounds of especial utility for oral administration, for unlike the ordinary penicillins, our penicillin acids are not destroyed by the acid content of the stomach, but can pass through the stomach without appreciable loss of potency into the intestine where they can be absorbed. The suitability of a penicillin acid of this invention for oral administratiion has been demonstrated by numerous tests carried out in both experimental animals and human subjects. In the tests, the penicillin acid was usually administered as a compressed tablet, but other suitable forms of administration can be used, such including filled capsules, and aqueous and oleaginous suspensions.

Our novel penicillin acids are readily prepared by the biosynthetic procedures described in United States Patents Nos. 2,479,295, 2,479,296 and 2,479,297. As is set forth in said patents, biosynthetic penicillins are obtained by growing a penicillin-producing mold in a suitable moldgrowth culture medium containing a precursor compound which the mold incorporates in substantial part in the penicillin the mold produces.

As is disclosed specifically in Example 18 of U. S. Patent No. 2,479,295, the sodium salt of phenoxymethyl penicillin (therein named phenoxypenicillin) is prepared by growing a penicillium mold of the notatum-chrysogenum group in the presence of N-(2-hydroxyethyl)-phenoxyacetamide, and then isolating as the sodium salt the phenoxymethyl penicillin which is produced. Our novel penicillin acid in solid form can be obtained from that salt simply by dissolving the alkali salt in water and precipitating the free acid with an acid such as hydrochloric acid. The precipitated crystalline acid is then filtered off and dried. The free acid form of phenoxymethyl penicillin, which is only slightly soluble in water, melts at about 120–128° C.

Alternatively, phenoxymethyl penicillin acid can be obtained by growing the mold in the presence of a minor amount of phenoxyacetic acid. From the culture medium, the solid penicillin acid is obtained, and is substantially freed from any accompanying phenoxyacetic acid by acidifying the clarified culture medium to about pH 2.1, and extracting the acidified broth with chloroform. Because of the favorable chloroform-water distribution ratio of phenoxymethyl penicillin with respect to that of phenoxyacetic acid which is used as the precursor, the bulk of the phenoxymethyl penicillin is extracted into the chloroform phase whereas most of the phenoxyacetic acid remains dissolved in the water phase.

The p-cresoxymethyl penicillin is obtained by the same biosynthetic procedures as set forth above, using, for example, p-cresoxyacetamide or p-cresoxyacetic acid as the precursor.

Further by way of example, the preparation of phenoxymethyl penicillin acid and its purification by means of chloroform extraction is as follows:

A culture medium is prepared consisting of 4 g. of phenoxyacetic acid, 200 cc. of brewers yeast autolysis product (containing 20 g. of nitrogen per liter), and 1800 cc. of a culture medium having the following compositions:

|  | Percent |
|---|---|
| $FeSO_4.7H_2O$ | 0.01 |
| $H_3PO_4$ | 0.4 |
| $MnSO_4.H_2O$ | 0.025 |
| $CaCl_2$ | 0.01 |
| Lactose | 3.0 |
| Glucose | 1.0 |

The medium is placed in a 5 liter flask, the medium is inoculated with the mold, air is supplied to the medium at a rate of 2 liters per minute, and the mixture is fermented at 24° C. for a period of 7 days, sterile conditions being maintained as is customary.

A total of 3 liters of culture medium obtained as described above, containing about 1200 units of penicillin activity per ml., as determined by iodometric assay, are clarified by filtration, are acidified to pH 2.1 and are extracted with 500 cc. of chloroform. The chloroform solution is decolorized with activated carbon and is extracted with buffer solution. The buffer is acidified to pH 2.1 and is extracted with 50 cc. of chloroform, thereby producing a chloroform solution containing 63,400 units of penicillin activity per cc. of solution. The chloroform is evaporated to dryness yielding 1.9 g. of solid phenoxymethyl penicillin acid which assays about 1500 units of activity per milligram. The penicillin acid is further purified by taking it up in sufficient 1 percent aqueous sodium hydroxide solution to produce a neutral solution, and precipitating the penicillin acid by the addition of sufficient hydrochloric acid to bring the pH of the mixture to about pH 1.7. The precipitated penicillin acid is filtered off and washed with about 100 cc. of cold water. 1.5 g. of phenoxymethyl penicillin are obtained which upon iodometric assay give an assay value of 1690 units/mg.

Solid p-cresoxymethyl penicillin acid is obtained by the foregoing procedure using the same culture medium and conditions except that 4 g. of p-cresoxyacetic acid is employed as a precursor. The isolation and purification of the p-cresoxymethyl penicillin is carried out in the same manner as above. p-Cresoxymethyl penicillin assaying about 1630 units per milligram by iodometric assay is obtained. It melts at about 120° C.

We claim:
1. A solid crystalline penicillin acid of the group consisting of phenoxymethyl penicillin and p-cresoxymethyl penicillin acid.
2. Solid crystalline phenoxymethyl penicillin acid.
3. Solid crystalline p-cresoxymethyl penicillin acid.

References Cited in the file of this patent

UNITED STATES PATENTS

| | | |
|---|---|---|
| 2,479,295 | Behrens et al. | Aug. 16, 1949 |
| 2,562,410 | Behrens et al. | July 31, 1955 |

OTHER REFERENCES

Behrens et al.: "J. Biol. Chem.," vol. 175, September 1948, pp. 793–809.
Lily Report CMR–L–30, October 31, 1945, pp. 3–4.
Lily Report CMR–L–26, May 15, 1945, pp. 3–7.